May 1, 1951  J. E. HOPKINS  2,550,813
SAFETY TYPE COUPLING APPARATUS FOR TRACTORS
Filed Sept. 19, 1949
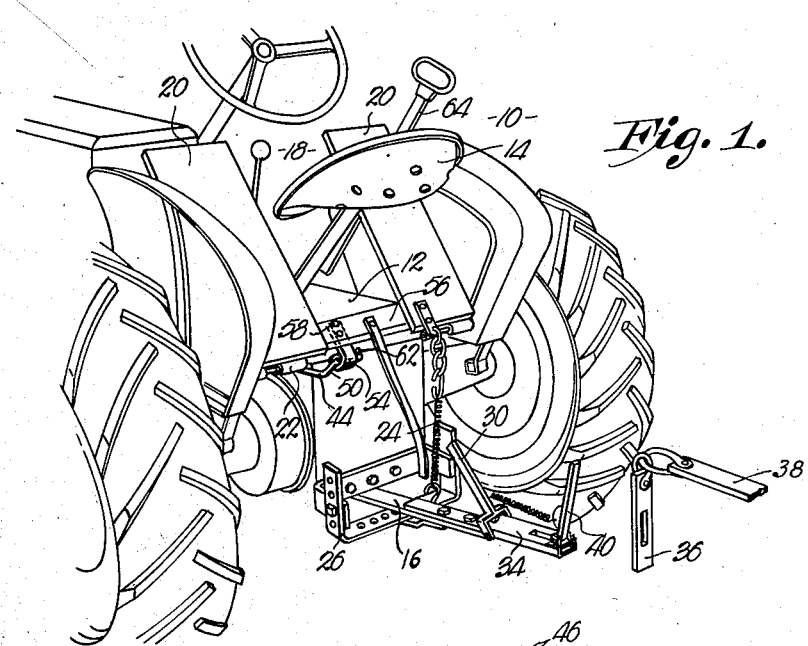
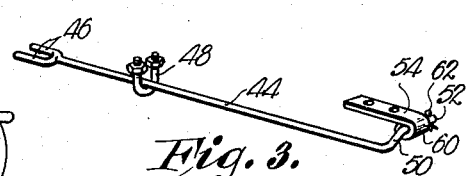
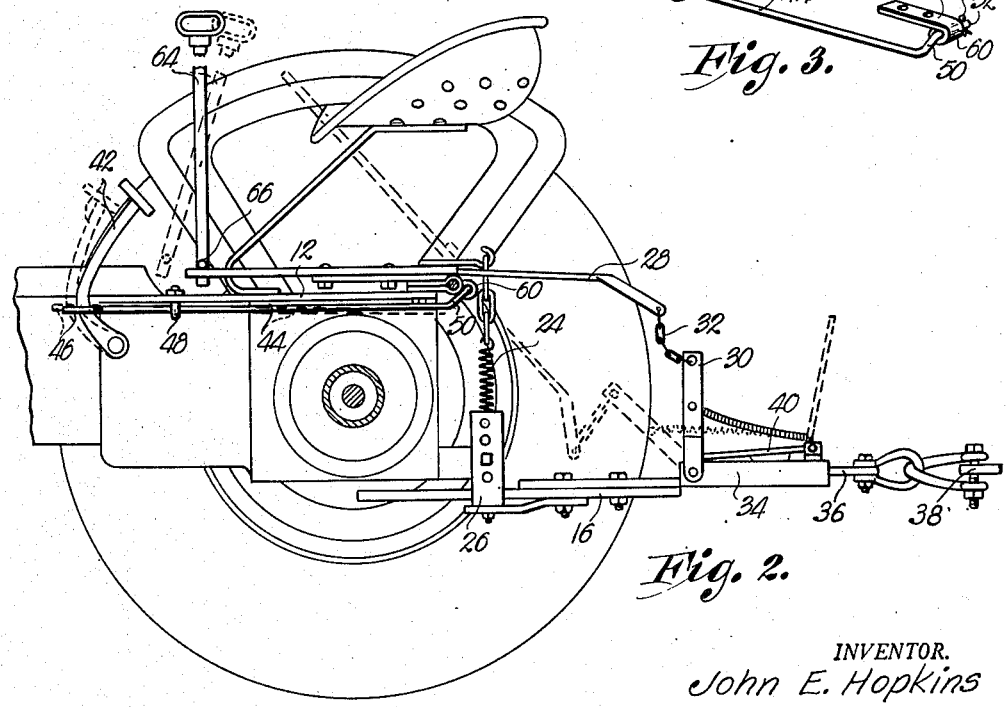
INVENTOR.
John E. Hopkins
BY
ATTORNEY.

Patented May 1, 1951

2,550,813

UNITED STATES PATENT OFFICE 2,550,813

SAFETY TYPE COUPLING APPARATUS FOR TRACTORS

John E. Hopkins, Sedgwick, Kans.

Application September 19, 1949, Serial No. 116,514

2 Claims. (Cl. 180—82)

This invention has to do broadly with the field of farm implements including tractors and devices actuated and moved thereby, the primary object being to provide a safety device usable with and mounted upon a tractor or like drawing vehicle, capable of automatically disengaging the implement being drawn by the tractor and to render the tractor inoperable from the standpoint of further forward or rearward travel in the event that the operator falls from the tractor or becomes otherwise disabled and incapable of properly operating the tractor and the mechanism pulled thereby.

Another important object of the present invention is to improve upon the safety device forming the subject matter of my co-pending application, Serial No. 775,421, filed on September 22, 1947, and entitled "Safety Hitch for Tractors."

Another important object of the present invention is to provide a safety device for use upon tractors including a swingable secondary platform adapted to receive the feet of the operator when he is positioned on the tractor and having parts connected thereto capable of not only disengaging coupling means between the tractor and a drawn implement, but capable of disengaging the tractor clutch by moving the clutch pedal to the inoperative position whenever the operator falls from the tractor or becomes otherwise unable to efficiently operate the tractor.

A further object of the present invention is to provide a safety device in the nature of a secondary swingable platform biased toward a position for disengaging the tractor clutch and disconnecting an implement connected with the tractor, there being an elongated rod connected with the secondary platform and terminating adjacent the clutch pedal whereby, as the platform swings upwardly, said rod moves against the clutch pedal and causes the latter to shift to a clutch-disengaging position.

Other more minor objects will be made clear or become apparent as the following specification progresses, reference being had to the accompanying drawing, wherein:

Fig. 1 is a perspective view of a safety type coupling apparatus for tractors made in accordance with my present invention and showing the same operably mounted upon a tractor.

Fig. 2 is a substantially central, vertical, cross-sectional view through the tractor illustrated in Fig. 1, showing the safety coupling hereof in elevation; and Fig. 3 is a perspective view of the clutch engaging rod per se.

The tractor chosen for illustration in Figs. 1 and 2 of the drawing, is broadly designated by the numeral 10. Tractor 10 is provided with an operator's platform 12 having a seat 14. In addition, the usual tractor presently on the market is provided with an elongated, swingable tow-bar 16 that projects rearwardly from the rearmost end of tractor 10 below seat 14 and platform 10.

In my aforesaid co-pending application, there is disclosed a swingable secondary platform broadly designated by the numeral 18 having an elongated panel 20 on each side respectively of the seat 14 and swingable to and from a super-imposed position with respect to the main platform 12 through the medium of hinges 22 at the rearmost ends of panels 20 that are secured to the proximal edge of platform 12. The secondary platform 18 is held biased at the uppermost end of its path of travel as shown in full lines in Fig. 1 and in dash lines in Fig. 2 through the medium of a spring 24 interconnecting platform 18 at its rearmost edge and a guide bracket 26 for the tow-bar 16 and forming a part of the tractor 10. A rearwardly extending arm 28 on the platform 18 is connected with a lever 30 by means of a chain or the like 32.

Lever 30 is swingably mounted upon a hollow member 34 for receiving a bar 36 that is in turn attached to tongue portion 38 of an implement to be drawn by tractor 10 and not illustrated in the drawing. When the bar 36 is within the hollow member 34, a latch 40 is swung downwardly from the position illustrated in Fig. 1 to the horizontal position shown by Fig. 2, to interconnect bar 36 and the member 34. The arm 30 is thereupon swung to a position overlying the latch 40 as shown in Fig. 2 for holding the latter in the locked position.

The hollow member 34 is affixed to the tow-bar 16 and when an operator of the tractor 10, falls from the seat 14 or from platform 12 whereby his weight is removed from the secondary platform 18, the latter swings to the position shown in Fig. 1 and the arm 28 actuates arm 30 and thereby automatically releases latch 40.

While the above construction as contemplated by my aforesaid co-pending application, effectively releases the implement being drawn by tractor 10 whenever an operator becomes incapacitated with respect to operation of tractor 10, such construction fails to prevent continued operation of the tractor 10 with likely damage thereto and injury to the operator himself, depending of course, where he falls.

Accordingly, it is the object of the present invention to also automatically stop the tractor against continued forward or rearward movement by disengaging the clutch thereof (not shown) through swinging of the usual clutch pedal 42 from the clutch engaging position shown by full lines in Fig. 2 to the clutch disengaging position shown by dotted lines in said figure.

To this end there is provided an elongated rod 44 provided with a pair of furcations 46 at one end thereof adapted to embrace the clutch pedal 42 in the manner shown in Fig. 2 of the drawing. The elongated rod 44 extends below the platform 12 from the rearmost edge of secondary platform 18 and is supported intermediate the ends thereof for free reciprocable movement longitudinally by a U-shaped bracket 48 secured to and depending from the platform 12. That end of the rod 44 opposite to the furcations 46, is bent upwardly as at 50 and thence laterally as at 52.

An arm 54 is secured to a bar 56 interconnecting the panels 20 at the rearmost ends thereof by bolts or the like 58. The rearmost end of the bracket 54 extends outwardly beyond the bar 56 and is provided with a barrel or bearing 60 for rotatably receiving the laterally extending stretch 52 of the rod 44.

A cotter key or the like 62 passing transversely through the rod portion 52 holds the latter releasably connected with the bracket 54.

In operation, the platform 18 is normally held substantially horizontally in parallel superimposed relationship to the platform 12 as indicated by full lines in Fig. 2 of the drawing by the weight of the operator's feet resting upon panel sections 20. When the secondary platform 18 is in such position, the elongated rod 44 is in a retracted position with respect to the clutch pedal 42 as shown in full lines in Fig. 2.

Whenever the operator is not upon the tractor in the normal operating position either on seat 14 or standing upon the platform 18, spring 24 automatically swings platform 18 to the position shown in Fig. 1 and as much platform 18 swings upwardly, the rod 44 is pushed forwardly and the bifurcated end 46 of rod 44 engaging clutch pedal 42, will move the latter to the dotted line position shown in Fig. 2 where the clutch of the tractor is disengaged. Sufficient clearance is provided in the U-shaped supporting member 48 to permit slight swinging movement of the rod 44 as the same reciprocates longitudinally.

It is to be appreciated that this safety feature of preventing forward or rearward movement of the tractor, is advantageous not only from the standpoint of the operator falling from the tractor while in motion, but will maintain the tractor 10 inoperative at all times until such time as the operator actually climbs upon the platform 12, moves the secondary platform 18 downwardly and thereby permits clutch pedal 42 to move to a clutch-engaging position. Accidents resulting from the accidental movement of gear shifting levers into gear by persons operating on or about the tractor, together with accidents that result from movement of the tractor while starting, will be prevented by use of the present safety device since the tractor positively cannot move either forward or backward as long as the platform 18 is held in the position shown in Fig. 1 by spring 24.

In the event that it becomes necessary to operate the clutch pedal 42 when it is impossible to hold platform 18 in the position shown by full lines in Fig. 2, a pivotally mounted lever 64 is provided to swing as illustrated in Fig. 2 where a laterally extending pin 66 on lever 64 overlies a portion of the forwardmost end of platform 18.

It is appreciated that the entire assembly of parts is fully fool-proof from the standpoint of safe operation and the same can be easily and inexpensively manufactured as well as adapted for virtually any type of tractor Many changes and modifications could of course, be made to the details of construction above outlined and shown in the drawing, but it is manifest that those that fairly come within the scope of the appended claims are contemplated hereby.

Having thus described the invention, what is claimed as new and desired to be secured by Letters Patent is:

1. For a tractor having a platform, a clutch pedal movable to and from a clutch-disengaging position, and a tow-bar provided with releasable, implement-coupling mechanism; structure for automatically moving the clutch to said position and releasing said mechanism upon movement of an operator from a normal position on the platform, said structure comprising a member movably attached to said tractor adjacent said platform and adapted to be held at one end of its path of travel by said operator on the platform; means joined with said member for holding the latter biased toward the opposite end of its path of travel; and apparatus operably connecting said member with said clutch pedal and with said mechanism respectively for moving the clutch pedal to said clutch-disengaging position and releasing said mechanism upon movement of the member to said opposite end of its path of travel by said means.

2. For a tractor having a main platform, a clutch pedal movable to and from a clutch-disengaging position, and a tow-bar provided with releasable, implement-coupling mechanism; structure for automatically moving the clutch to said position and releasing said mechanism upon movement of an operator from a normal position on the main platform, said structure comprising a member movably attached to said tractor adjacent said main platform and adapted to be held at one end of its path of travel by said operator on the main platform; means joined with said member for holding the latter biased toward the opposite end of its path of travel; and apparatus operably connecting said member with said clutch pedal and with said mechanism respectively for moving the clutch pedal to said clutch-disengaging position and releasing said mechanism upon movement of the member to said opposite end of its path of travel by said means, said member comprising a secondary platform swingably secured to the tractor and disposed to receive the feet of the operator when the latter is in said normal position and when the secondary platform is at said one end of its path of travel.

JOHN E. HOPKINS.

REFERENCES CITED

The following references are of record in the file of this patent:

UNITED STATES PATENTS

| Number | Name | Date |
|---|---|---|
| 1,262,456 | Colwell | Apr. 9, 1918 |
| 1,323,634 | Kagay | Dec. 2, 1919 |
| 2,256,238 | Brown | Sept. 16, 1941 |
| 2,377,303 | Acton | June 5, 1945 |